(12) United States Patent
Philp

(10) Patent No.: US 6,374,864 B1
(45) Date of Patent: Apr. 23, 2002

(54) HELICALLY-WOUND CONDUIT

(76) Inventor: Perry Philp, 75 Mary Street Unit 7, Aurora, Ontario (CA), L4G 1G3

( * ) Notice: Subject to any disclaimer, the term of this patent is extended or adjusted under 35 U.S.C. 154(b) by 0 days.

(21) Appl. No.: 09/656,944

(22) Filed: Sep. 7, 2000

(51) Int. Cl.⁷ .............................................. F16L 11/08
(52) U.S. Cl. ...................... 138/119; 138/125; 138/127; 138/129; 138/133; 138/154
(58) Field of Search ................... 138/119, 125, 138/126, 127, 129, 132, 133, 154; 428/36.91, 36.92

(56) References Cited

U.S. PATENT DOCUMENTS

| | | | |
|---|---|---|---|
| 3,554,237 A | * 1/1971 | Pelley et al. | 138/149 |
| 3,674,056 A | * 7/1972 | D'Aprile | 138/129 |
| 3,739,815 A | * 6/1973 | Rejeski | 138/129 |
| 3,847,184 A | 11/1974 | God | |
| 4,023,834 A | 5/1977 | Ewing et al. | |
| 4,204,562 A | * 5/1980 | Kelly | 138/129 |
| 4,400,863 A | 8/1983 | Schroeder | |
| 4,415,185 A | 11/1983 | Vinciguerra et al. | |
| 4,462,556 A | * 7/1984 | Graham, Jr. | 138/129 |
| 4,662,404 A | 5/1987 | LeVeen et al. | |
| 4,669,757 A | 6/1987 | Bartholomew | |
| 4,788,089 A | * 11/1988 | Skipper | 138/129 |
| 4,929,478 A | * 5/1990 | Conaghan et al. | 138/129 |
| 5,158,112 A | 10/1992 | Wood | |
| 5,263,646 A | 11/1993 | McCauley | |
| 5,486,388 A | 1/1996 | Portas et al. | |
| 5,837,083 A | 11/1998 | Booth | |
| 5,954,096 A | * 9/1999 | Lepoutre | 138/129 |
| 6,158,477 A | * 12/2000 | Waters | 138/129 |

* cited by examiner

Primary Examiner—James Hook
(74) Attorney, Agent, or Firm—Bereskin & Parr

(57) ABSTRACT

A helically wound conduit formed from a single continuous strip, the strip being formed from alternating first and second strip portions. Second strip portions are more flexible than first strip portions and the conduit as a result has greater flexibility in the sections formed from the second strip. A reinforcing wire may be added to strengthen the conduit.

11 Claims, 5 Drawing Sheets

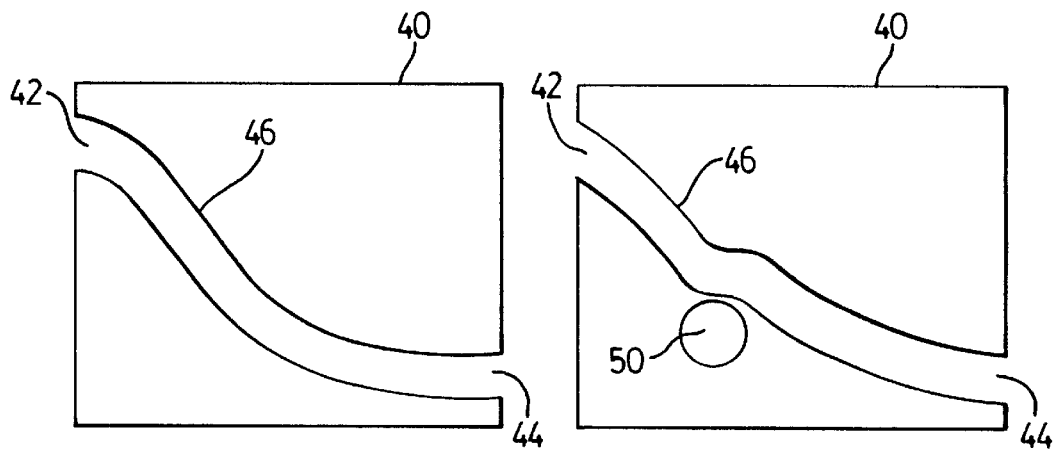
FIG. 4
(PRIOR ART)
FIG. 4a
(PRIOR ART)
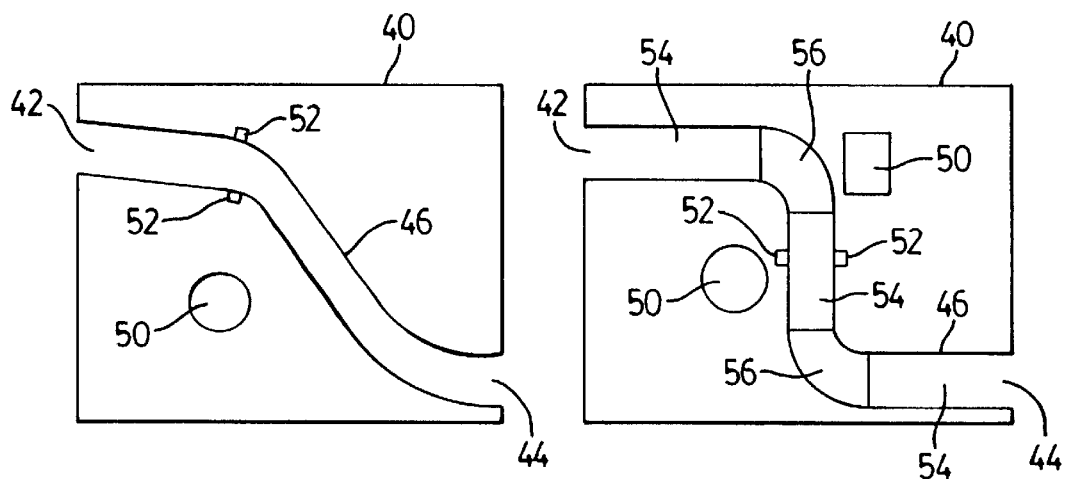
FIG. 4b
(PRIOR ART)
FIG. 4c
(PRIOR ART)

US 6,374,864 B1

HELICALLY-WOUND CONDUIT

FIELD OF THE INVENTION

This invention relates to conduits, and in particular, to helically wound flexible conduits and a strip for forming a helically wound conduit.

BACKGROUND OF THE INVENTION

Helically wound conduits are used for many types of fluid handling in many applications, especially in the field of fume extraction. These conduits may be constructed by helically winding a flexible strip of material to form a helically-wound conduit. Often these conduits are placed in environments which require air or other gases to be transferred around corners. Some environments are enclosures which require a fluid to be transferred from one end of the enclosure to another where an obstacle lies in the direct line path. In other cases, the conduit must pass through a complex path which requires one or more changes of direction.

One solution is to use a series of ducts which are connected to transport the fluid around the obstacle or around the corner. This solution is complex and costly as very exact measurements must be made to ensure that the ducts are properly joined together and that the inlet and outlet are at the desired locations.

Another way to get around this problem is to use a conduit formed from flexible material and bending the conduit around that corner. However, if such a conduit is required to pass through a lengthy passage and is only supported at each end, the conduit will droop in the middle.

Another solution to this problem is to join together a plurality of separate conduits having the necessary shape and stiffness or flexibility. However, such a conduit requires joints to connect the separate conduits resulting in undesirable manufacturing difficulties.

Accordingly, there is a need for a conduit having at least one flexible section and at least one stiff section without reduces the complexity of manufacture by using fewer components.

SUMMARY OF THE PRESENT INVENTION

The present invention is accordingly directed to a strip for forming a helically wound conduit having at least one first elongated strip portion formed from a first material having a first and a second strip end and at least one second elongated strip portion formed from a second material having a first and second strip end. The second strip end of the at least one second strip portion is affixed to the first strip end of the first strip portion to form a single continuous strip. The second material is more flexible that the first material. Preferably, the first strip portion and the second strip portion have the same width.

In a preferred embodiment, the strip also has a reinforcing wire affixed to at least one of the first strip portion and the second strip portion. The strip has a leading edge and a trailing edge and may be wound helically to form a generally cylindrical conduit, the trailing edge being affixed to the leading edge of each successive helix.

This invention is also directed to a continuous elongated strip for forming a helically wound conduit having a plurality of first elongated strip portions formed from a first material and second elongated strip portions formed from a second material. The strip portions each have a first and second strip end. The first and second strip portions are alternately affixed to one another by affixing the first strip ends to the second strip ends to form a single contiguous strip. The second material is more flexible than the first material.

This invention is also directed to a helically wound conduit for conducting fluids. The conduit has at least one first conduit section formed from a helically wound first strip portion formed from a first material. The conduit also has at least one second conduit section formed from a helically wound second strip portion formed from a second material. The second strip portion is affixed to the first conduit section to form a single contiguous conduit. The second material is more flexible than the first material.

BRIEF DESCRIPTION OF THE DRAWINGS

For a better understanding of the present invention and to show clearly how it may be carried into effect, reference will now be made, by way of example, to the accompanying drawings which show a preferred embodiment of the present invention and in which:

FIG. 4 is a front view of an enclosure with a flexible conduit according to the prior art;

FIG. 4a is a front view of an alternative enclosure with a flexible conduit according to the prior art;

FIG. 4b is a front view of a further alternative enclosure with a flexible conduit according to the prior art;

FIG. 4c is a front view of an enclosure with a stiff conduit according to the prior art;

DETAILED DESCRIPTION OF THE INVENTION

Figure 1:
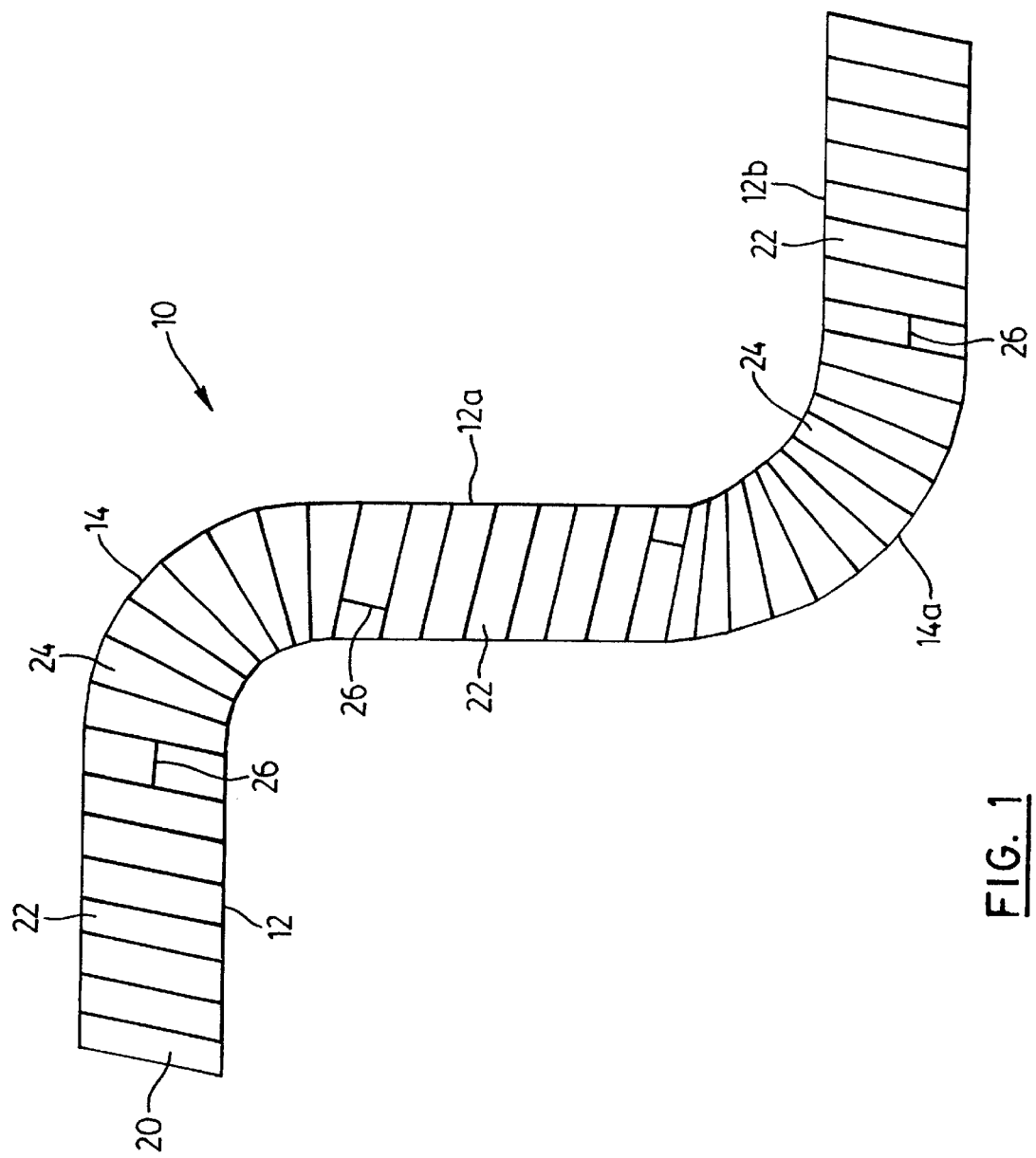
FIG. 1 is a front view of a preferred embodiment of a conduit made in accordance with the subject invention.

Referring to FIG. 1, illustrated therein is a conduit 10 shown generally in accordance with a preferred embodiment of the invention. Conduit 10 is a helically-wound conduit having at least one rigid conduit section 12 and at least one flexible conduit section 14. The conduit shown in FIG. 1 has three rigid sections 12, 12a, and 12b and two flexible sections 14 and 14a.

Figure 2:
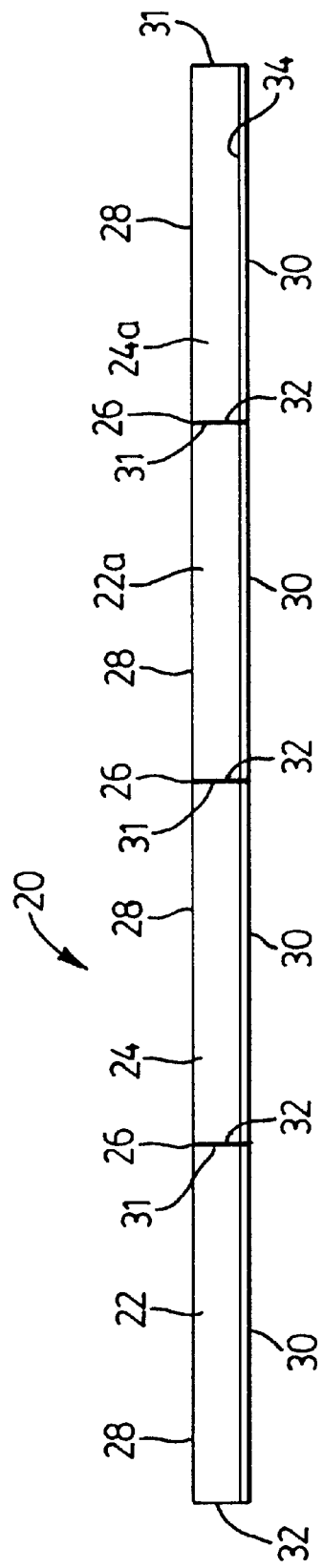
FIG. 2 is a front view of a preferred embodiment of a strip made in accordance with the subject invention.

Conduit 10 is a helically-wound conduit formed from a strip as shown in FIG. 2. Strip 20 has at least one elongated first strip portion 22 and at least one elongated second strip portion 24. As shown in FIG. 2, the strip 20 has two first strip portions 22 and 22a and two second strip portions 24 and 24a. Each of first strip portions 22 and 22a and second strip portions 24 and 24a have the same width and comprise a leading edge 28, a trailing edge 30, a first end 31 and a second end 32. Strip portions 22 and 24 are connected by attaching first end 31 of first strip portion 22 to second end 32 of second strip portion 24 along joints 26 to form the elongated strip 20. An additional first strip portion 22a may be attached by connecting first end 31 of second strip portion 24 to second end 32 of first strip portion 22. Additional strip portions may be added in this manner. There are many ways to connect the strip portions to one another including sewing, welding, solvent bonding, vulcanizing and using adhesives. The material used for the second strip portions 24 is preferably more flexible than the material used for first strip portions 22. Strip 20 may optionally further comprise a reinforcing wire 34. Reinforcing wire 34 may be placed anywhere between leading edge 28 and trailing edge 30 although it preferably is placed along one of leading edge 28 or trailing edge 30 to provide support for conduit 10. Reinforcing wire 30 may also be affixed during the winding process, discussed below.

Figure 3:
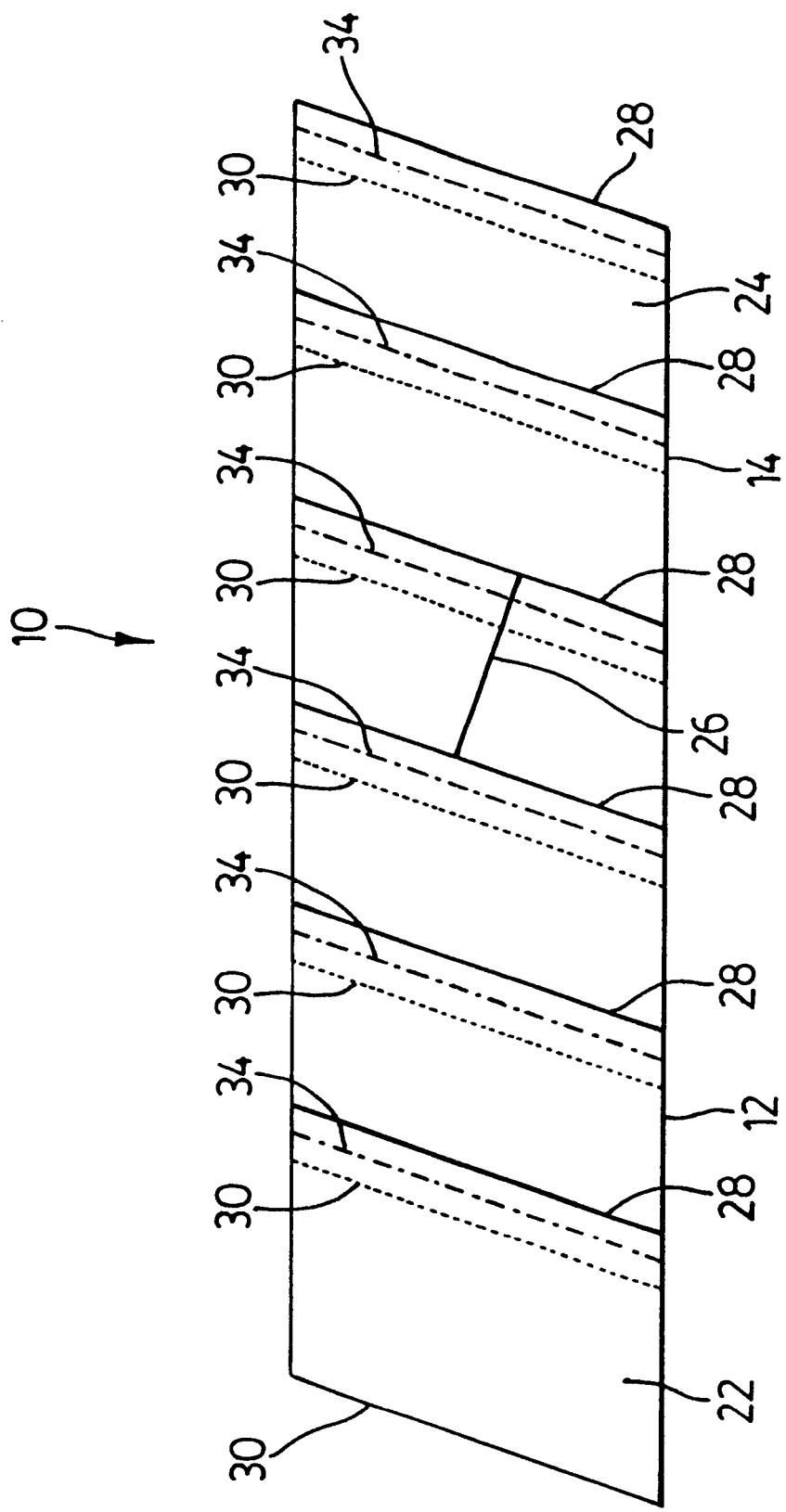
FIG. 3 is a more detailed front view of a section of the conduit of FIG. 1.

FIG. 3 shows strip 20 as wound into a section of conduit 10. Strip 20 is wound in a helical pattern through a helical winder as is known in the art. The helical winder forms strip 20 into a helical pattern and causes leading edge 28 of strip 20 as it emerges to overlap trailing edge 30 of a helix of strip 20 that has already passed through the winder. If strip 20 does not already incorporate reinforcing wire 34, the helical winder may affix reinforcing wire 34 to strip 20 during winding. Reinforcing wire 34 may be placed a preset distance from either leading edge 28 or trailing edge 30 such that reinforcing wire 34 is located along the centreline of the overlap between leading edge 28 and trailing edge 30. Alternatively, reinforcing wire 34 may be affixed at other preset distances either on the inside or outside of conduit 10.

In order to form a helically-wound conduit, leading edge 28 and trailing edge 30 will be affixed by any means known in the art. One method of affixing leading edge 28 to trailing edge 30 with reinforcing wire 34 is shown in U.S. Pat. No. 5,158,152 which is incorporated herein by reference.

When strip 20 is formed into a single contiguous helically-wound conduit, the section of the conduit formed from the first strip portion 22 will be less flexible than the section of the conduit formed from the second strip portion 24. As a result, conduit section 12 which is formed from the first material will be relatively rigid compared to conduit section 14 which is formed from the second material. By changing the relative lengths of first strip portions 22 and second strip portions 24, the relative lengths of the stiff and flexible conduit sections 12 and 14 may also be adjusted to suit the application. As will be obvious to a person skilled in the art, a series of alternating flexible and stiff materials used in the strip may be used to create a conduit having numerous alternating flexible and stiff sections.

FIG. 4a shows an enclosure 40 having an inlet 42, an outlet 44 and a conduit 46 according to the prior art. A conduit is required for the transmission of air or another gas from inlet 42 to outlet 44. Since inlet 42 and outlet 44 are not aligned, a straight conduit would not be desirable. Flexible conduit will allow for the transmission of air from inlet 42 to outlet 44. However, as flexible conduit 46 is unsupported, conduit 46 droops along its length due to the gravitational force acting on conduit 46.

FIG. 4a shows the enclosure 40 of FIG. 4 with an obstacle 50 in the path of conduit 46. The gravitational force on conduit 46 causes conduit 46 to rest against obstacle 50. This is undesirable if obstacle 50 has a high temperature (conduit 44 may melt as a result) or if it vibrates (conduit 44 may eventually be shaken out of inlet 42 or outlet 44). FIG. 4b shows the enclosure 40 of FIG. 4 with the addition of mounting clips 52 to support conduit 44 at one point. This is still undesirable as the gravitational force will still cause conduit 44 to droop along the unsupported sections of conduit 44. FIG. 4c shows the enclosure 40 of FIG. 4 with a plurality of stiff formed conduits having straight or curved shapes which have been joined together to form a conduit which is mounted using mounting clips 52 to avoid obstacles 50 as is known in the prior art. This way of avoiding the obstacles is undesirable as joints are required between the straight and curved conduits 54 and 56.

Figure 5:
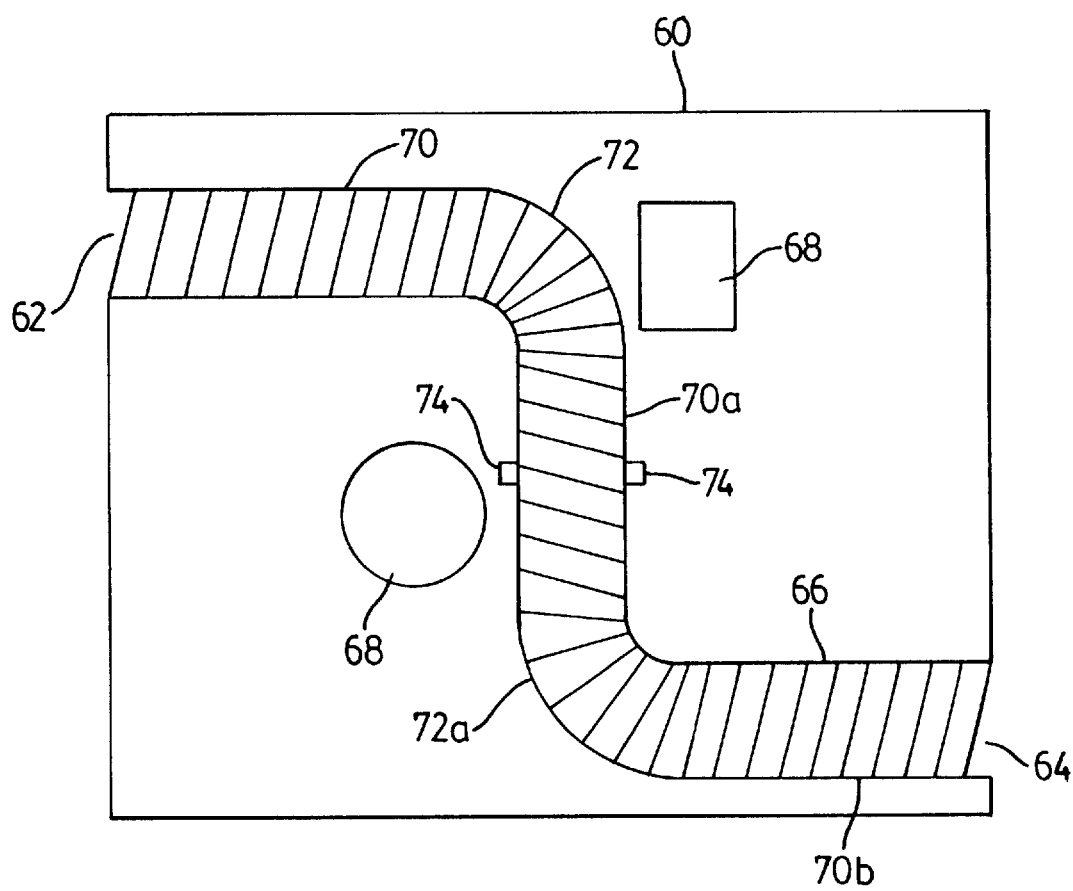
FIG. 5 is a front view of an enclosure with a conduit made in accordance with the subject invention.

FIG. 5 shows an enclosure 60 having an inlet 62, an outlet 64, a conduit 66 according to the present invention, and obstacles 68. Flexible conduit is composed of alternating stiff conduit sections 70, 70a and 70b and flexible conduit sections 72 and 72a positioned to avoid obstacles 50. As can be seen from FIG. 5, stiff conduit sections 70, 70a and 70b have different lengths. As discussed above, the stiff strip portions of the strip may be of different lengths to allow the stiff conduit sections to have different lengths as desired in the application. Mounting clips 74 may optionally by used to support the weight of conduit 66.

It is to be understood that what has been described is a preferred embodiment to the invention. The invention nonetheless is susceptible to certain changes and alternative embodiments fully comprehended by the spirit of the invention as described above, and the scope of the claims set out below.

I claim:

1. A strip for forming a helically wound conduit comprising:

(a) at least one first elongated strip portion formed from a first material having a first and a second strip end and two side edges; and (b) at least one second elongated strip portion formed from a second material, having a first and a second strip end and two side edges, said second strip end of said at least one second strip portion affixed to said first strip end of said at least one first strip portion to form a single contiguous strip with two side edges, and wherein said second material is more flexible than said first material.

2. A strip as claimed in claim 1 wherein said at least one first strip portion and said at least one second strip portion are of substantially the same width.

3. A strip as claimed in claim 1 further comprising a reinforcing wire affixed to at least one of the first strip portion and the second strip portion.

4. A strip as claimed in claim 3 wherein one of said side edges of said strip is has a leading edge and the other of said side edges of said strip is a trailing edge and said strip is helically wound to form a generally cylindrical conduit, the trailing edge being affixed to the leading edge of each successive turn of said helix.

5. A strip as claimed in claim 1 having a plurality of first strip portions, the first strip portions and the at least one second strip portion connected end-to-end to form a single contiguous strip.

6. A strip as claimed in claim 1 having a plurality of second strip portions, the at least one first strip portion and the second strip portions connected end-to-end to form a single contiguous strip.

7. A helically wound conduit for conducting fluids comprising:

(a) at least one first conduit section comprising a helically wound first strip portion, the first strip portion formed from a first material; and, (b) at least one second conduit section comprising a helically wound second strip portion affixed to said first conduit section to form a single contiguous conduit, said second conduit section formed from a second material, and wherein said second material is more flexible than said first material.

8. A helically wound conduit as claimed in claim 7 wherein said first strip portion comprises a first and a second strip end and two side edges and said second strip portion comprises a first and a second strip end and two side edges, said first strip end of said first strip portion being affixed to said second strip end of said second strip portion.

9. A helically wound conduit as claimed in claim 7 wherein said first strip portion and said second strip portion further comprise a reinforcing wire.

10. A helically wound conduit as claimed in claim 7 having a plurality of first conduit sections, the first conduit sections and the at least one second conduit section connected end-to-end to form a single contiguous conduit.

11. A helically wound conduit as claimed in claim 7 having a plurality of second conduit sections, the at least one first conduit sections and the second conduit sections connected end-to-end to form a single contiguous conduit.

* * * * *